US009205979B2

(12) United States Patent
Steinbach

(10) Patent No.: US 9,205,979 B2
(45) Date of Patent: Dec. 8, 2015

(54) WAREHOUSE SYSTEM HAVING SEVERAL AISLES AND AUTOMATED METHOD FOR OPERATING SAME WHILE THE AISLE IS IN A MAINTENANCE MODE

(71) Applicant: SSI Schaefer Noell GmbH Lager- und Systemtechnik, Giebelstadt (DE)

(72) Inventor: Rainer Steinbach, Himmelstadt (DE)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 0 days.

(21) Appl. No.: 14/262,892

(22) Filed: Apr. 28, 2014

(65) Prior Publication Data

US 2014/0301810 A1    Oct. 9, 2014

Related U.S. Application Data

(63) Continuation of application No. PCT/EP2012/069880, filed on Oct. 8, 2012.

(30) Foreign Application Priority Data

Oct. 26, 2011    (DE) .......................... 10 2011 117 487

(51) Int. Cl.
*B65G 65/00* (2006.01)
*B65G 1/04* (2006.01)

(52) U.S. Cl.
CPC ............ *B65G 1/0492* (2013.01); *B65G 1/0421* (2013.01); *B65G 2207/40* (2013.01)

(58) Field of Classification Search
CPC ............... B65G 1/0421; B65G 1/0492; B65G 2207/40; B65G 43/00; F16P 3/08
USPC ................................................ 414/273–275
See application file for complete search history.

(56) References Cited

U.S. PATENT DOCUMENTS

| 5,141,381 | A | | 8/1992 | Kato et al. | |
|---|---|---|---|---|---|
| 5,629,674 | A | * | 5/1997 | Fahrion | .......................... 340/556 |

(Continued)

FOREIGN PATENT DOCUMENTS

| DE | 3919167 C1 | * | 9/1990 |
|---|---|---|---|
| DE | 19529079 A1 | | 8/1995 |
| DE | 19628123 A1 | | 1/1998 |

OTHER PUBLICATIONS

International Search Report for corresponding patent application No. PCT/EP2012/069880 dated Dec. 12, 2012.

*Primary Examiner* — Saul Rodriguez
*Assistant Examiner* — Mark Hageman
(74) *Attorney, Agent, or Firm* — Renner, Otto, Boisselle & Sklar, LLP

(57) ABSTRACT

A warehouse system comprising a control device; a plurality of racks defining rack aisles each of which includes an access and is secured against unauthorized entry by an operator by the access, wherein a first sensor monitors whether the access is closed or open and transmits corresponding status signals to the control device; a plurality of rack serving units each of which travels in an automated manner along a rack aisle and includes a load handling device for storing and retrieving storage goods. Each load handling device has assigned a second sensor which detects whether the load handling device is in a retracted neutral position, currently extracts, or is extracted, and which transmits a corresponding state signal to the control device. The system further includes an aisle-serving switch device that communicates with the control device and can be shifted physically by an access key between automatic and maintenance positions.

18 Claims, 2 Drawing Sheets

(56) References Cited

U.S. PATENT DOCUMENTS 6,834,215 B1 * 12/2004 Ostwald ................. 700/214
8,272,495 B2 * 9/2012 Zech .................. 198/341.01
8,694,152 B2 * 4/2014 Cyrulik et al. ............. 700/214
2010/0125361 A1 * 5/2010 Mougin et al. ............ 700/217

* cited by examiner

WAREHOUSE SYSTEM HAVING SEVERAL AISLES AND AUTOMATED METHOD FOR OPERATING SAME WHILE THE AISLE IS IN A MAINTENANCE MODE

RELATED APPLICATIONS

This is a continuation application of the co-pending international patent application PCT/EP2012/069880 (WO 2013/060569 A1) filed on Oct. 8, 2012, which claims the priority of the German patent application DE 10 2011 117 487.0 filed on Oct. 26, 2011, both of which are herein incorporated fully by reference herewith.

BACKGROUND OF THE INVENTION

The present invention relates to a warehouse system having a plurality of rack) aisles, wherein in each of the rack aisles at least one rack serving unit is operated, and wherein the aisle(s) arranged directly adjacent to a to-be-maintained aisles is/are further operated in a one-side operational mode, wherein particularly the safety standard DIN EN 528 is met. The references herein to DIN EN 528 are to said standard that was in effect as of the filing date of the German priority application, i.e. Oct. 26, 2011.

RELATED PRIOR ART

In conventional automated (rack) warehouse systems which are operated in an automated manner with regard to storage and retrieval of storage goods by means of (rack) serving units there are only a few possibilities to avoid standstills of the warehouse system if one of the serving units needs to be maintained (e.g., repaired) manually on the spot. The safety standard DIN EN 528 prohibits continued operation of neighbouring rack aisles, which are arranged directly adjacent to the to-be-maintained rack aisle, in an automatic mode if it is not guaranteed that the rack serving units of the neighbouring rack aisles cannot move any storage goods towards the to-be-maintained aisle (e.g., pushing through) where such storage goods could fall on the operator working at the to-be-maintained rack serving unit. Pushing through of one of the storage goods (load and/or load carrier) is to be understood as a situation when a load handling device of one of the rack serving units, which is operated in a directly adjacent rack aisle, moves one of the storage goods too far into the to-be-maintained rack aisle so that this storage good drops into the to-be-maintained rack aisle. This situation can occur during storage of one of the storage goods as well as during retrieval thereof. During the storage of a storage good the load handling device of the directly adjacent rack serving unit can either push one stored storage good, which is placed at a front rack location of the to-be-maintained rack aisle towards the to-be-maintained rack aisle by means of the storage good which is to be stored so that the stored storage good drops into the to-be-maintained aisle. Further, the to-be-stored storage good can be moved across a neighboring rack which is arranged adjacent directly to a rack of the to-be-maintained aisle, as well as across the rack of the to-be-maintained rack aisle itself so that the to-be-stored storage good drops into the to-be-maintained rack aisle. This situation can occur if the load handling device can reach multiple-deep into a rack, which is operated multiple-deep, or if a (single) rack row is served from both sides by means of respectively one rack serving unit.

"Pushing through" of one storage good is avoided with single-deep or multiple-deep racks by means of mechanical push-through locking devices. Mechanical obstacles can be provided with a (e.g., respectively single-deep) double rack, which comprises two single-deep racks arranged back-to-back, between storage or rack locations being arranged in a directly neighboring manner with regard to storage and retrieval directions, wherein the mechanical obstacles prevent that neither the load handling device nor the storage good itself can be moved into the directing neighboring storage location.

It is clear that a similar problem arises also during retrieval processes. During retrieval processes it can happen that the load handling device of a directly neighboring rack serving unit is extracted too far during the receipt of a to-be-retrieved storage good or that the load handling device abuts against the to-be-retrieved storage good so that a neighboring stored storage good, which is sitting in a rack of the to-be-maintained rack aisle, is pushed into the to-be-maintained rack aisle. Also this situation can be avoided due to a mechanical push through locking device between directly neighboring storage locations.

According to another known solution a mathematical-legal argument is used or fulfilling the strict requirements of the safety standard DIN EN 528. In this context, some manufacturers of conventional warehouse systems argue due to their experience that at maximum only one single disturbance a day happens in each rack aisle so that the likelihood of a storage good being moved into the to-be-maintained rack aisle by means of a directly neighboring rack serving unit is negligible small. Based on this argumentation some manufacturers take the risk of switching off only the to-be-maintained rack aisle while the other rack aisles—and in particular the rack aisles directly neighboring the to-be-maintained rack aisle—are still operated in an automated manner. In this case, the problem arises—even if this is statistically only relative unlike—that a directly neighboring rack serving unit pushes one of the storage goods into the to-be-maintained rack aisle nevertheless, while a mechanic is working in this rack aisle.

In order to eliminate this remaining risk there is only the possibility of either installing mechanical push-through locking devices or switching off the directly neighboring rack aisles as well. A (later) installation of mechanical push-through locking devices is associated with greater work efforts, higher costs and long downtimes.

The general turning off of additional rack aisles is associated with a reduction of the performance of the overall system so that both known solutions to the above-described problem are unsatisfactory.

SUMMARY OF THE INVENTION

Therefore, it is an object of the present invention to provide an automated warehouse system as well as a method for operating same, which overcome the above-described disadvantages.

According to first aspect of the invention a warehouse system is proposed comprising: a control device; a plurality of racks defining a plurality of rack aisles therebetween, wherein each of the rack aisles comprises an access and is secured against unauthorized operator access due to the access, the access being locked and unlocked by means of an access key, wherein a first sensor monitors whether the access is closed or open and transmit corresponding status signals to the control device; a plurality of rack serving units, wherein in each of the rack aisles at least respectively one rack serving unit can travel in an automated manner at least along a longitudinal direction of the rack aisle and wherein each of the rack serving units comprises at least a load handling device or shuttle which can be extracted and retracted on both sides along a transverse direction or storing and retrieving storage goods in and from each of the racks in an automatic mode in an automated manner, the racks being arranged directly adjacent to the respective load handling device, wherein each of the load handling devices has assigned at least one second sensor which detects whether the load handling device is in a retracted neutral position or currently extracts or is extracted, and which transmits a corresponding state signal to the control device; and at least one aisle-service switch device, wherein each of the switch devices communicates with the control device and can be set by means of an access key physically between an automatic position and a maintenance position, wherein the access key in the automatic position is physically connected inseparably to the respective switch device and is connected in the maintenance position physically separable from the respective switch device, in order to open one of the accesses which is determined by one of the rack aisles to be maintained; wherein the control device is adapted: to communicate with the rack serving units, each of the switch devices, the first sensors and the second sensors; to operate each of the rack serving units in the automatic mode if the status signal signals that all of the accesses are closed; to instruct each of the load handling devices of one of the rack serving units which is operated in a directly neighbouring rack aisle adjacent to the to-be-maintained rack aisle to which the operator needs to gain admission for the purpose of maintenance, in a maintenance mode to only store and retrieve storage goods in and from such racks which are not arranged directly adjacent to the to-be-maintained rack aisle; and to initiate an emergency switching of the to-be-maintained rack aisle and at least of the directly adjacent rack aisle, if a state signal comes in which indicates that one of the load handling devices of the rack servicing units of the directly adjacent rack aisles is extracted towards one of the racks which is arranged direct adjacent to the to-be-maintained rack aisle.

According to a second aspect a warehouse system comprises: a control device; a plurality of racks defining a plurality of rack aisles therebetween, wherein each of the rack aisles comprises an access and is secured by means of the access against entry of an unauthorized operator, the access being locked and unlocked by means of an access key, wherein a first sensor monitors whether the access is closed or open and transmits corresponding status signals to the control device; a plurality of rack serving units, wherein in each of the rack aisles at least respectively one rack serving unit travels in an automated manner at least along a longitudinal direction of the rack aisle and wherein each of the rack serving units comprises at least one load handling device, or shuttle, which can be extracted and retracted on both sides in a transverse direction for storing and retrieving storage goods in an automated manner in and from each of the racks in an automatic mode, the racks being arranged directly adjacent to the respective load handling device, or shuttle, wherein each of the load handling devices, or shuttles, has assigned at least one second sensor which detects whether the load handling device, or shuttle, is in a retracted neutral position, currently is extracted or extracted, and which transmits a corresponding state signal to the control device; and at least one aisle-serving switch device, wherein each of the switch devices communicates with the control device and is settable physically by means of the access key between an automatic position and a maintenance position, wherein the access key in the automatic position is physically connected inseparably to the respective switch device and in the maintenance position is physically connected separably from the respective switch device, in order to open one of the accesses which is determined by one of the to-be-maintained rack aisles; wherein the control device is adapted: to communicate with the rack serving units, each of the switch devices, the first sensors, and the second sensors; to operate each of the rack serving units in the automatic mode if the status signal signals that all of the accesses are closed; to instruct each of the load handling devices of one of the rack serving units which is operated in a maintenance mode in a directly neighbouring rack aisle adjacent to the to-be-maintained rack aisle to which the operator needs to gain admission for the purpose of maintenance, to only store and retrieve storage goods in and from such racks which are not arranged directly adjacent to the to-be-maintained rack aisle; and to initiate an emergency switching of the to-be-maintained rack aisle and at least of the directly adjacent rack aisle, if a state signal comes in which indicates that one of the load handling devices of the rack servicing units of the directly adjacent rack aisles is extracted towards one of the racks which is arranged direct adjacent to the to-be-maintained rack aisle.

The invention provides a solution in terms of control meeting the safety requirements of the safety standard DIN EN 528 without the need to provide mechanical devices preventing push-throughs. Instead of allowing the rack serving units of the directly adjacent rack aisles to further store and retrieve from both sides in case of a maintenance, these rack serving units are only operated single-sided, mainly along a direction which is oriented opposite to the to-be-maintained rack aisle. In this manner it is avoided that the load handling device of the rack serving units move storage goods towards the to-be-maintained aisle. Nevertheless, the rack serving units of the directly adjacent aisle can be still operated. Thus, the safety is ensured by 100% although the neighboring aisles are still operated in the automatic mode, even if limited to a single-sided manner.

However, this single-side limitation can already be considered during initial assignment of storage locations carried out by a storage-location administration. The storage-location administration can be conducted by the control device. The storage-location administration can distribute the to-be-stored article range in dependence on the article range which is to be stored into each of the rack aisles already from the beginning so that each of the articles of the range is present at both sides of the rack aisle, i.e., is respectively present in both of the racks limiting the rack aisle. In this case, a material flow computer, which can also be implemented at least partially by the control device of the invention, still has access to all of the articles of one aisle even if this aisle can only be operated in a single-sided manner. The performance of the overall system thus suffers only imperceptibly due to the fact that one (or more) of the rack aisles need to be maintained.

It is clear that the performance of the overall system is only influenced insignificantly stronger if the distribution of the range of articles is not focused on the possibility of serving the rack aisle from one side only. In this case, the material flow computer can queue such transport commands concerning storage goods which are to be retrieved from the racks or stored in the racks being arranged adjacent to the to-be-maintained rack aisle.

Further, it is not possible for an operator to enter the to-be-maintained aisle without the entry being registered by the control device and without corresponding safety measures being initiated by the control device.

With a preferred embodiment each of the access keys interacts in a mechanical manner with both one of the switch devices and one of the accesses for changing the switch device and unlocking the access to the to-be-maintained rack aisle.

The mechanical unlocking of the access of the to-be-maintained rack aisle reduces the sensors to be used as well as the corresponding cabling. If the access key mechanically unlocks the access it is sufficient that the opening process of this access is monitored. For example, this can happen by means of a light barrier or a light sensor which can be arranged such that a state (change) signal is output as soon as the access (e.g., a door) is opened from a locked state. The opening process of the access signals to the control device that the operator is actually willing to enter the corresponding aisle. It is clear that the sensor can also be of a different type. Instead of an optical sensor (light barrier, light sensor, etc.), for example, an inductive or capacitive sensor can be used as well.

Alternatively, the access of the to-be-maintained rack aisle can be locked and unlocked electronically by means of an associated access key, wherein the control device is adapted to unlock the access of the to-be-maintained rack aisle only if the state signals from the directly adjacent rack aisles signal that each of the corresponding load handling devices is not (or no longer) extracted towards the to-be-maintained rack aisle.

In this case, the sensor is coupled directly to the lock of the access and notifies the control device on the open or closed access. In this case, the access is considered open as soon as the access is unlocked. Additional sensors such as light barriers, light sensors and the like are not provided, which monitor the actual opening process of the access. Hence, there is not difference between unlocking and opening. Consequently, since in this case no information on the actual opening process of the access is present, the control device needs to ensure that any one of the load handling devices in the directly adjacent aisles is extracted into one of the racks which are arranged directly adjacent to the to-be-maintained aisle. Therefore, the access to the to-be-maintained aisle can only be opened if all of the load handling devices have been removed from this "forbidden area". This is verified and ensured by the control device.

Preferably, each of the rack aisles comprises respectively one switch device wherein each of the switch devices comprises an individual access key.

In this manner the control device does not need to be notified explicitly on which one of the rack aisles has been entered by the operator. This information is obtained by the control device only by the fact that the aisle-service switch device of a specific one of the rack aisles is set from the automatic position to the maintenance position, for example, by rotating the access key. This adjustment happens since otherwise the operator cannot remove the access key from the aisle-service switch device for unlocking the access to the to-be-maintained rack aisle.

Further, it is advantageous if each of the switch devices comprises an illumination push button, wherein each of the illumination push buttons comprises a lamp which is not illuminated if the associated rack aisle is operated in a double-side automatic mode, which blinks, if the associated rack aisle is still operated in the double-side automatic mode, and which is illuminated permanently as soon as the associated rack aisle is operated in a one-side automatic mode or in the maintenance mode.

The lamps increase the safety. The operator is optically notified on the state of a respective one of the rack aisles. As long as the lamps of the direct adjacent rack aisles are blinking the operator knows that the rack serving units in these aisles have not yet been switched to the one-side operational mode, but are still operated in the double-side operational mode. Ideally the operator waits until these lamps are illuminated permanently, since the permanent illumination signals that the corresponding rack serving units are then in the one-side operational mode.

As already mentioned above, it is also possible that the operator enters the to-be-maintained rack aisle while the lamps are flashing. In this case, the control device causes the switching of an emergency stop if the load handling device of a directly adjacent rack serving unit, which is still operated in the double-side operational mode at that time, either travels into a neighboring rack or is still extracted into one of the neighboring racks.

According to a third aspect of the invention it is disclosed a method for safely operating, in accordance with the safety standard DIN EN 528, an automatic warehouse system having a plurality of rack aisles, wherein the warehouse system preferably is formed in accordance with the invention, wherein in each of the rack aisles at least one rack serving unit having a load handling device is provided and automatically operated, and wherein each of the rack aisles respectively comprises an access which can be locked, opened and closed, the method comprising the following steps: inquiring whether a control device of the warehouse system changes to a maintenance mode; removing an access key from a switch device by shifting the access key from an automatic position to a maintenance position and subsequently taking out same, and moving the removed access key to a to-be-maintained rack aisle, after having changed to the maintenance mode; unlocking an access of the to-be-maintained rack aisle by means of the removed access key; inquiring from first sensors whether one of the accesses is open, and activating a respectively second sensor which monitors each of the load handling devices of one of the rack serving units being arranged directly adjacent to the to-be-maintained rack aisle, with regard to a neutral position of the corresponding load handling device as soon as it has been determined that the access of the to-be-maintained rack aisle is open; and performing an emergency switching, if: one of the accesses is opened during the automatic mode; an access different than the access of the to-be-maintained rack aisle is opened during the maintenance mode; or the access of the to to-be-maintained rack aisle is opened and a load handling device of one of the rack serving units being arranged directly adjacent to the to-be-maintained rack aisle leaves the neutral position towards the to-be-maintained rack aisle or has already left same.

According to a fourth aspect of the invention it is disclosed in an automatic warehouse system a method for safely operating, in particular in accordance with the safety standard DIN EN 528, the automatic warehouse system comprising a control device, at least one switch device, at least one access key, a plurality of rack aisles each having an access provided with a first sensor, wherein in each of the rack aisles at least one rack serving unit having a load handling device, which is provided with a second sensor respectively, is provided and automatically operated, and wherein each of the rack aisles respectively comprises an access which can be locked, opened and closed, the method comprising the following steps: inquiring whether the control device of the warehouse system changes to a maintenance mode; removing the access key from the switch device by shifting the access key from an automatic position to a maintenance position and subsequently taking out same, and moving the removed access key to a to-be-maintained rack aisle, after having changed to the maintenance mode; unlocking the access of the to-be-maintained rack aisle by means of the removed access key; inquiring from the corresponding first sensor whether the corresponding accesses is open, and activating the corresponding second sensor which monitors the load handling devices of the rack serving units being arranged directly adjacent to the to-be-maintained rack aisle, with regard to a neutral position of the corresponding load handling device as soon as it has been determined that the access of the to-be-maintained rack aisle is open; and performing an emergency switching; if one of the accesses is opened during the automatic mode; if an access different than the access of the to-be-maintained rack aisle is opened during the maintenance mode; or if the access of the to to-be-maintained rack aisle is opened and the load handling device of one of the rack serving units, being arranged directly adjacent to the to-be-maintained rack aisle leaves the neutral position towards the to-be-maintained rack aisle or has already left same.

With regard to the method, the advantages refer to in the context of the warehouse system of the invention apply analogously.

Preferably, a range of articles is distributed to each of the rack aisles such that each of the articles of the article range is present in both racks which are defining the respective rack aisle therebetween.

BRIEF DESCRIPTION OF THE DRAWINGS

It is clear that the above mentioned and still to be explained features cannot only be used in the respectively given combination but also in other combinations or alone without departing from the scope of the present invention.

Embodiments of the invention are illustrated in the drawings and will be explained in further detail by the description below.

PREFERRED EMBODIMENTS OF THE INVENTION

Figure 1:
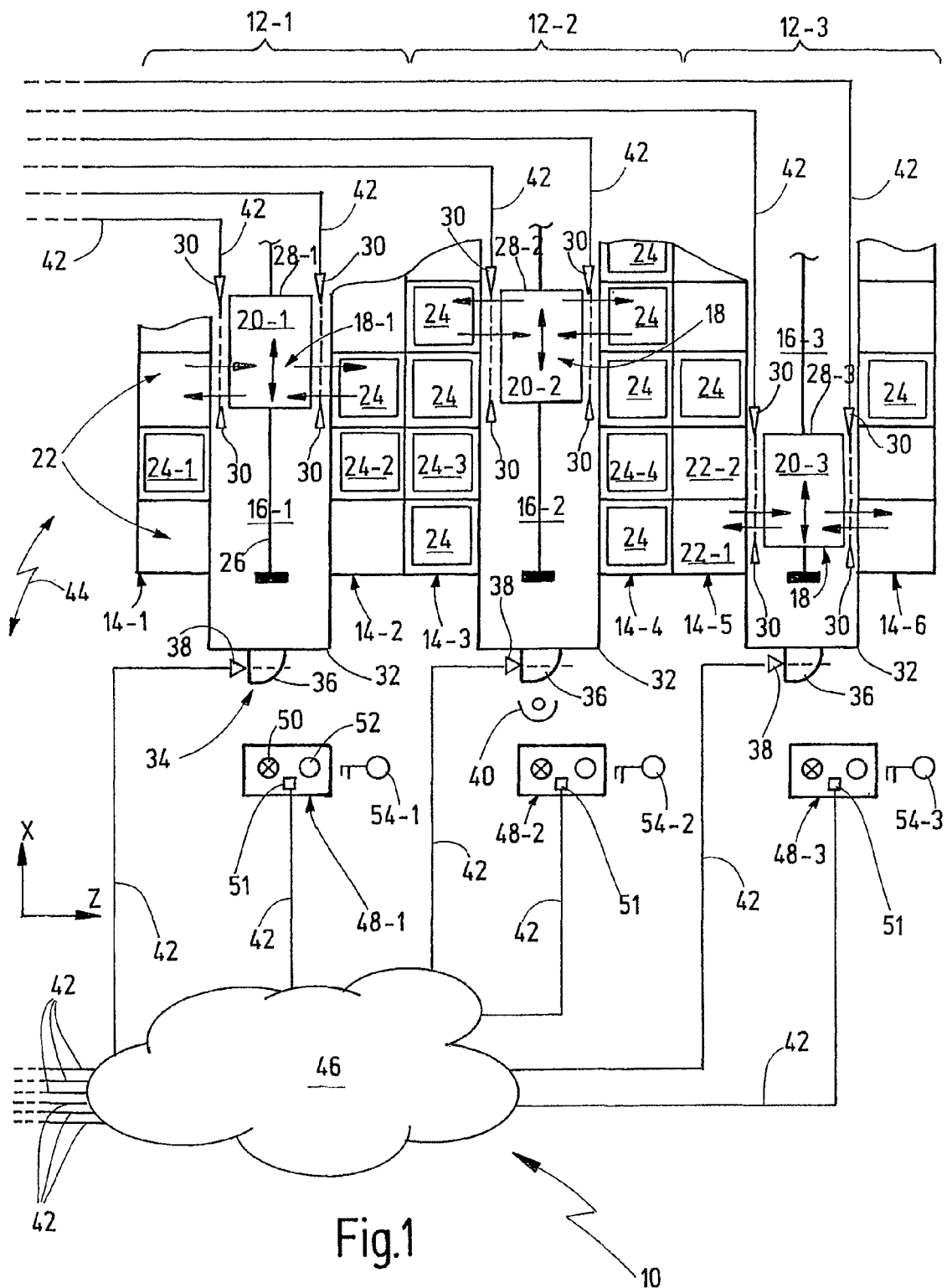
FIG. 1 shows a block diagram of a warehouse system 10 of the invention.

FIG. 1 shows are warehouse system 10. The warehouse system 10 comprises a plurality of rack modules 12, wherein FIG. 1 exemplarily shows three rack modules 12-1, 12-2 and 12-3. One rack module 12 comprises at least one (single) rack 14 and at least one rack aisles (hereinafter also designated briefly as "aisle") 16, wherein in each of the rack aisles 16 at least one rack serving unit 18 is operated in an automated manner. The rack serving units 18 are transport vehicles, which are preferably rail-guided, in a partially or fully automated warehouse. In FIG. 1, for example, three storage and retrieval device 20-1, 20-2 and 20-3 are shown, which are operated in the aisles 16-1 to 16-3. A storage and retrieval device 20 is a storage machine (e.g. transfer vehicle, shuttle, SQS, STS, etc.), travelling in the aisle 16 between two racks 14 in a rail-guided manner. Typically, the rack serving unit 20 comprises a chassis, one or more masts, a hoist unit and a load handling device 28. Receipt of load happens in case of palettes, for example, by means of a pair of forks, which can be moved in a telescopic manner; in case of containers, for example, by retrieving through belt conveyors, traction devices; or in case of a shuttle by means of lifting platforms. The storage and retrieval devices 20 are guided respectively along a (ground) rail 26 in FIG. 1. Alternatively, for example, shuttles can be guided along rails attached to the racks. It is clear that rack serving units 18 can also be operated without rail-guidance. The rack serving units 18, for example, can be realized by forklifts which are moved along the aisles 16, for example, preferably driverless, by means of laser navigation.

In FIG. 1 each of the aisles 16-1 to 16-3 is respectively surrounded by one pair of racks. The aisle 16-1 is defined between the racks 14-1 and 14-2. The aisle 16-2 is defined between the racks 14-3 and 14-4. The aisle 16-3 is defined between the racks 14-5 and 14-6. The racks 14-2 and 14-3 as well the racks 14-4 and 14-5 respectively represent a so-called double rack. A double rack is typically formed by two single racks 14 arranged back-to-back. It is clear that between (directly) adjacent aisles 16 only one single rack can be provided as well where the aisles can then be accessed by both rack serving units 18 by means of their load handling devices 28. Alternatively, multiple-deep racks 14 can be used as well, in particular also at the outer sides. In this case, the load handling devices 28 are adapted to handle storage goods 24 multiple-deep. In the example of FIG. 1 the rack modules 12-1 to 12-3 are exemplarily formed by respectively two single racks 14 defining one aisle 16 therebetween in which at least one storage and retrieval device 20 can travel substantially in a longitudinal direction X (cf. dark double arrow).

The racks 14 comprise a plurality of storage locations or rack compartments 22, some of which are illustrated in FIG. 1 in an empty state or in a filled state. The rack compartments 22 can also be replaced by channels. In this case, typically shuttles are used for moving the storage goods within one of the channels. These shuttles can be transferred between the channels by means of a storage and retrieval device so that the shuttles represent the load handling devices as mentioned above. (Palette) channels are often filled and emptied in accordance with the FIFO- (First In First Out-)principle, wherein this principle is associated with a particularly high risk of pushing one of the storage goods into the to-be-maintained aisle by means of the shuttle.

If the racks 14 are formed single-high, the "rack compartments" correspond to storage locations.

The storage locations 22 extend in rows along the longitudinal direction X, wherein one of the storage locations 22 is arranged side-by-side to another one of the storage locations 22. The storage locations 22 can be arranged in multiple planes (along the height direction Y) so that the storage locations 22 are arranged in the shape of a matrix. In FIG. 1, for example, only one of a plurality of planes is shown. FIG. 1 shows a schematic top view.

The load handling devices 28 of the storage and retrieval devices 20 can store one or more storage goods 24 in the storage locations 22 along a transverse direction Z. The transverse direction Z is oriented perpendicular relative to the longitudinal direction X and perpendicular relative to the height direction Y. The load handling devices 82 can also retrieve storage goods 24, i.e. can retrieve them from one of the storage locations 22. In FIG. 1 the possibility of storing and retrieving is indicated by means of dark arrows oriented in parallel relative to the transverse direction Z. The storage and retrieval devices 20 are moved substantially in the longitudinal direction X along the aisles 16. The load handling devices 28 can be moved by means of hoist units, which are not illustrated in more detail, along masts, which are not illustrated in more details as well, upwardly and downwardly along the height direction Y. It is clear that for each of the storage location planes one shuttle can be used, if, for example, shuttles are used as rack serving units 18. Typically, one separate shuttle is provided for each of the storage location planes. Typically, the shuttle represents a one-plane storage and retrieval device.

Since the rack serving units 18 automatically store and retrieve the storage goods 24, it is necessary to monitor the storage and retrieval processes. For this purpose, the rack serving units 18 can be equipped laterally with sensors 30, which are oriented along the longitudinal direction X and which can detect retraction or extraction movements of one of the load handling devices 28 in the transverse direction Z. The sensors 30 can be implemented, for example, by means of light sensors or (transmitter-receiver) light barriers, which are then oriented in the longitudinal direction X and are arranged at a height of the load handling device 28. Alternatively, the sensors 30 can be realized by path sensors determining the travel path of the load handling device 28, for example, by detecting revolutions of a drive pinion, thereby allowing determination of a position of the load handling device 28 relative to the racks 14. In a neutral position of the load handling devices 28, the load handling devices 28 are neither extracted positively nor negatively in the direction Z so that they do not project from a lifting platform (which is not depicted in more detail) of the rack serving unit 18. As soon as the load handling device 28 is extracted positively or negatively in the transverse direction Z, this is detected by the sensors 30. It is clear that at least one sensor 30 is provided at each of the load handling devices 28. If the sensors 30 are arranged outside of the rack serving unit 18 in a space between the rack serving unit 18 and the adjacent racks 14, each side requires sensors 30 (e.g., a shaft encoder). However, if only the relative position of the load handling device 28 is derived, for example, from the position and the revolutions of one drive pinion, then one single sensor is sufficient for each of the load handling devices 28.

Since the storage and retrieval devices 20 are typically operated in an automatic mode for storing and retrieving the storage goods 24 automatically, the aisles 16 need to be protected against unauthorized access by humans due to safety reasons. For this purpose, for example, fences 32 can be arranged at, for example, the front faces of the aisles 16, wherein humans cannot overcome the fences easily. In order to make the respective one of the aisles 16 still accessible, each of the aisles 16 is provided with at least one access 34, which is realized in terms of a door 36 in the example of FIG. 1. The access 34 can be locked, unlocked, opened and closed. A corresponding state of the access 34 can be monitored by means of an additional sensor 38 and can be output as a signal. The additional sensor 38 can be realized in terms of a light sensor or a light barrier. The additional sensor 38 is arranged so that the opening process of a closed door 36 is detected, preferably immediately. Only if the door 36 is open, the corresponding rack aisle 16 can be entered by an operator 40 (such as a technical engineer), as will be described in more detail below.

The different elements of the warehouse system 10 communicate either over solid lines 42 or wirelessly with a control device 46. The wireless connection 44 is indicated in terms of a double arrow. The control device 46 is indicated in terms of a cloud. The control device 46 is connected to the sensors 30 and 38, for example, by means of lines 42. The control device 46 can be arranged centrally or in a decentralized manner. The control device 46 can communicate wirelessly with the storage and retrieval devices 20 for notifying the storage and retrieval devices 20 of time and place for storing or retrieving the storage goods 24. The control device 46 is mainly responsible for the storage and retrieval devices 20, in particular with regard to their movements (travel of the storage and retrieval device 20 in the longitudinal direction X, travel of a lifting platform in the height direction Y and retracting/extracting the load handling device 28 in the transverse direction Z).

Further, the warehouse system 10 comprises at least one aisle-service switch device (hereinafter also briefly called "switch device") 48. For example, each of the aisles 16 in FIG. 1 is provided with a separate switch device 48. The aisle 16-1 is logically assigned to the switch device 48-1. The aisle 16-2 is logically assigned to the switch device 48-2. The aisle 16-3 is logically assigned to the switch device 48-3. Each of the switch devices 48-1 to 48-3 comprises a key taking up 52, and can comprise a lamp 50. Further, the switch device 48 can comprise a push button 51 for signalling to the control device that one of the aisles 16 is to be put into the maintenance mode. If the term "maintenance" is used in the present text, this includes, amongst other things, also reconditionings, repairs or service works in general. The key taking up 52 serves for receiving a respective one of the access keys 54. Preferably all of the access keys 54-1 to 54-3 are formed differently. In this case, the access key 54-1 only fits to the door 36 of the aisle 16-1. Then, the key 54-2 only fits to the door 36 of the aisle 16-2. In this case, the key 54-3 only fits to the door 36 of the aisle 16-3. The keys 54-1 to 54-3 do not fit to any one of the other aisles 16.

The key 54 can be formed of multiple parts. A first part of the access key 54 fits to the key taking up 52, and a second part of the access 54 fits to the door 36. The access 54 can comprise, for example, two different bits being arranged oppositely. The first bit of the access key 54 physically interacts with the key taking up 52. The key taking up 52 has two positions, an automatic position and a maintenance position. In the automatic position, the access key 54 needs to be inside the key taking up 52 and cannot be removed. The access key 54, for example, is rotated about its longitudinal axis for reaching the maintenance position. As soon as the access key 54 is in the maintenance position, it can be taken out, i.e. it can be separated and removed from the switch device 48. The control device 46 communicates with the switch device 48 and gets signalled (automatically) the respective position (automatic position or maintenance position). The second bit of the key 54 physically interacts with the door 36. The second bit can also be of an electronic nature as will be explained in more detail below.

Hereinafter the steps will be described which are to be taken for being allowed to access one of the aisles 16, for example, for the purpose of maintaining the storage and retrieval device 28 operated therein. For example, the storage and retrieval device 20-2 of the central aisle 16-2 of FIG. 1 is to be maintained. Assuming that the warehouse system 10 is initially operated in a (full) automatic mode, wherein all of the access keys 54-1 to 54-3 are in the automatic position of the switch devices 48-1 to 48-3, the operator 40 is required to access the central aisle 16-2. Consequently, the central aisle 16-2 represents the "to-be-maintained rack aisle". In this case, the aisles 16-1 and 16-3 represent "directly adjacent rack aisles". If there were additional aisles 16 to the left or to the right relative to the aisles 16-1 or 16-3, these aisles 16 (which are not shown in FIG. 1) were not direct adjacent rack aisles. If the aisle 16-1 would be the to-be-maintained rack aisle, there would be only one direct adjacent rack aisle, namely the central aisle 16-2.

In this case, the operator 40 turns the access key 54-2 within the switch device 48-2 from the automatic position to the maintenance position, and thus signals to the control device 46 that the central aisle 16-2 is to be maintained. The control device 46 communicates this information to the storage and retrieval devices 20-1 and 20-3 of the direct adjacent aisles 16-1 and 16-3, preferably in terms of changed travel instructions and changed retraction/extraction instructions. For this purpose, the control device 46 comprises the functionality of a material flow computer for directing the material flow in an immediate area around the to-be-maintained aisle 16-2, as will be explained in more detail below.

The control device 46 issues commands so that the direct adjacent storage and retrieval devices 20-1 and 20-3 no longer access adjacent racks 14 which are oriented towards the to-be-maintained aisle 16-2. With regard to the storage and retrieval device 20-1, these are the storage locations 22 in the adjacent racks 14-2 and 14-3, if the load handling device 28-1 can be operated double-deep. If the load handling device 28 can only operate single-deep, then only the rack 14-2 needs to be excluded from additional storage and retrieval processes. With regard to the storage and retrieval device 20-3 the racks 14-5 and 14-4 are to be excluded from storage and retrieval processes. In this manner it can be prevented that the storage and retrieval device 20-1 pushes the storage goods 24-3 inadvertently into the to-be-maintained aisle 16-2, for example, during retrieval of the storage good 24-2 while the load handling device 28-1 is extracted. The storage and retrieval device 20-3 does not take a risk to push the storage good 24-4 within the rack 14-4 inadvertently into the to-be-maintained aisle 16-2 during storage of one of the storage goods 24 into the second storage location 22-2 of the rack 14-5.

After the operator 40 has set the switch device 48 to the maintenance position, he/she can remove the access key 54-2 and use it for unlocking the door 36 of the central aisle 16-2. Since it typically takes a short time until the control device 46 has instructed the directly adjacent storage and retrieval devices 20-1 and 20-3 in a corresponding manner, the lamps 50 of the switch devices 48-1 and 48-3 can be operated, for example, in a flashing manner in the meantime until the storage and retrieval devices 20-1 and 20-3 have carried out their current travel orders which they have received from the control device 46 before the switch device 48-2 was set to the maintenance position. In this manner the operator 40 is visually notified when he/she is allowed to enter the central aisle 16 without danger, for example, by turning off the lamps 50 of the switch devices 48-1 and 48-3 as soon as the last (double-sided) travel instruction is carried out, which has been issued by the control device 46 before it was shifted into the (one-side) maintenance mode. The turning of one of the access keys 54 in the key taking up 52 thereof effects a shift of the control device 46 between an automatic mode and a maintenance mode. In the automatic mode one of the lamps 50, for example, can be lit permanently or can be turned off (dependent on definition of the illumination). In this manner, the operator 40 is visually signalled the state of the respective aisle 16.

While the central aisle 16-2 is shut down in the above-described manner and the directly adjacent aisles 16-1 and 16-3 are only operated in a one-side automated manner, other rack aisles 16, if present, can still be operated in the (double-side) automatic mode.

The operator 40 unlocks the door 36 of the central to-be-maintained aisle 16-2 by means of the access key 54-2. The access key 54-2 can comprise one single (mechanical) code which then fits to both the key taking up 52 of the control device 48-2 and the door 36 of the aisle 16-2. However, the access key 54-2 can also comprise several codes, for example, one additional electronic code allowing unlocking of the door 36 of the aisle 16-2.

Actual opening of the door 36 of the central aisle 16-2 can be detected, for example, from the outside by means of the sensor 38 which is preferably formed as light sensor or (transceiver) light barrier. The light sensor or the light barrier detects motion of a door leaf of the door 36. The sensor 38 can be integrated alternatively into a lock of the door 36 so that the control device 46 is already notified on the mechanical unlocking of the door 36 before the door 36 is actually opened.

As soon as the door 36 is unlocked, and at the latest when the door 36 is opened, which is transmitted to the control device 46 by means of the (external) sensor 38, the control device causes activation of monitoring a motion of the load handling devices 28-1 and 28-3 of the storage and retrieval devices 20-1 and 20-3 in the directly adjacent aisles 16-1 and 16-3 by activating the sensors 30. If one of the load handling devices 28-1 or 28-3 extracts—contrary to all expectations—towards the to-be-maintained aisle 16-2, i.e., into a forbidden area, or is already located there, this is, preferably immediately, detected by the sensors 30 and the switching thereof, and signalled to the control device 46 which in turn causes an emergency switching of at least the concerned storage and retrieval device 20, the load handling device 28 of which is extracted towards the forbidden direction. In the just described example this would be the sensor 30 which is arranged at the right-hand side of the load handling device 28-1, as well as the sensor 30 being arranged at the left-hand side of the load handling device 28-3.

This procedure results in that the rack aisle 16-1 can be further operated to the left in a one-sided manner, and in that the rack aisle 16-3 can be further operated to the right in a one-sided manner. If additional rack aisles 16 are present, they can be further operated fully automatically on both sides while the central rack aisle 16-2 is shut down for the purpose of maintenance.

As soon as the maintenance works are completed, the operator 40 leaves the central rack aisle 16-2, shuts the door 36 and locks the door 36 by means of the access key 54-2. Then, he/she returns to the switch device 48-2, inserts the access key 54-2 into the associated key taking up 52, and turns the access key 54-2 from the maintenance position into the automatic position. This process signals to the control device that now all of the rack aisles 16 can be operated again in the automatic mode. The lamps 50 are actuated correspondingly.

It is clear that the locks of the accesses 34 preferably can also be of a mechanical nature for preventing that the corresponding access key 54 of the access 34 can be removed without being closed again and locked.

Figure 2:
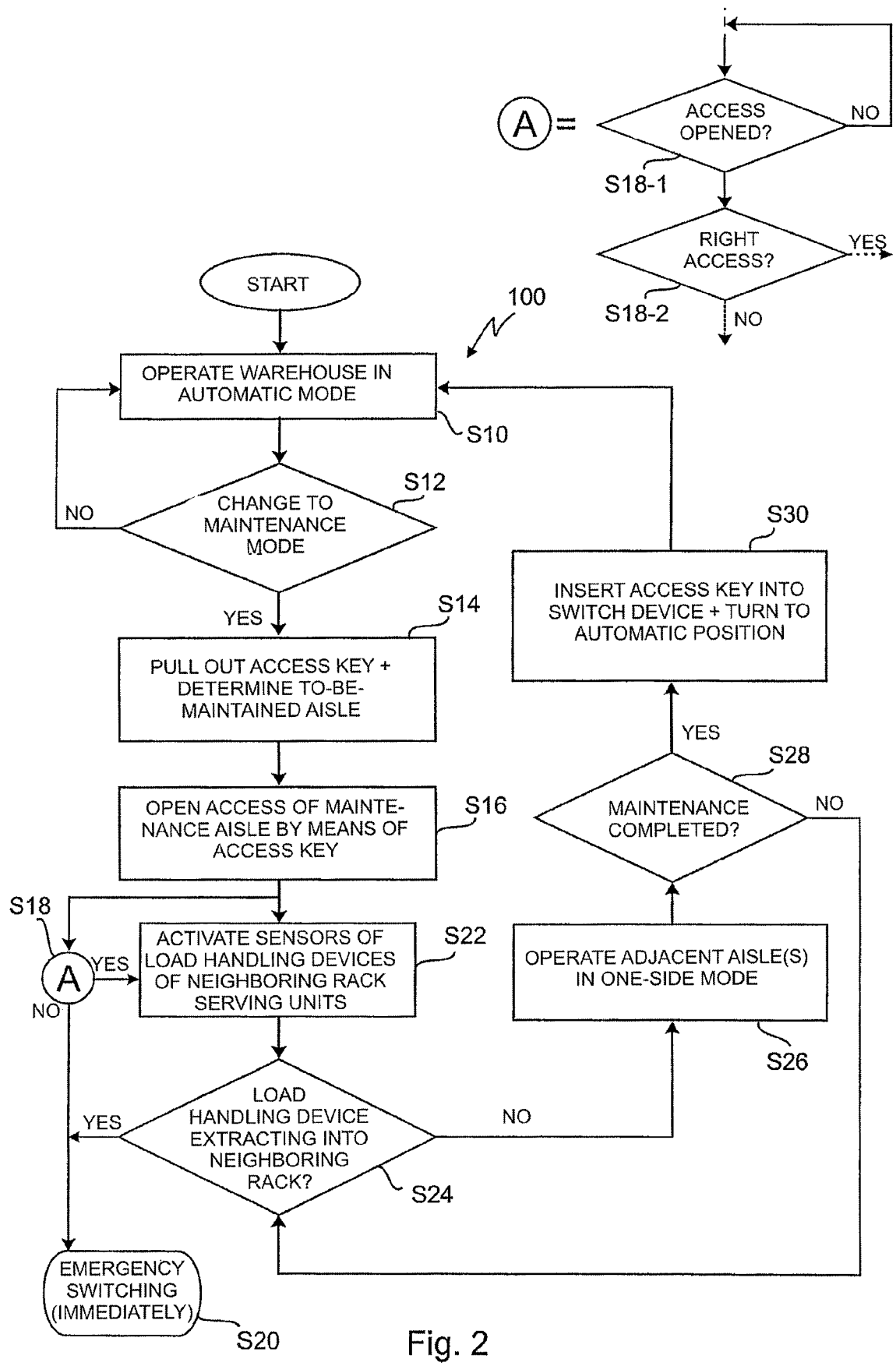
FIG. 2 shows a flow chart of a method in accordance with the invention.

With reference to FIG. 2 the above-described method is shown abstractly in terms of a flow chart 100.

At the beginning of the method 100 in accordance with the present invention the warehouse system 10 is operated in an automatic mode in step S10, i.e., the rack serving units 18 store and retrieve storage goods 24 in a fully automated manner. In step S12 it is inquired, whether it was switched into a maintenance mode. This inquiry is typically conducted by the control device 46 by inquiring the position of the access key 54 in the switch device 48. If the control device 46 has not (yet) changed to the maintenance mode, the warehouse system 10 is further operated in the automatic mode (cf. step S10). However, if a change of mode has occurred into the maintenance mode, the corresponding access key 54 of the associated switch device 48 can be removed by pulling out the access key 54, for example, from the key taking up 52 (cf. step S14). If only one single switch device 48 for all of the rack aisles 16 is present, the operator 40 chooses the to-be-maintained aisle 16 by means of the pushbutton 51 manually or walks to the to-be-maintained aisle 16 and unlocks as well as opens the associated access 34 (cf. step S16). The unlocking and opening can happen independent of whether drive and storage instructions have already been issued by the control device 46 to the rack serving units 18 in the directly adjacent aisles while the warehouse system 10 was still operated in the automatic mode. If this happens the warehouse system 10 can still continue to work until a load handling device 28 in a directly adjacent aisle 16 is extracted towards the racks 14 which are arranged directly adjacent to the to-be-maintained rack aisle 16.

If one of the load handling devices 28 is already in one of the "forbidden" racks, while the access 34 is open, this is detected by means of the corresponding sensor 30 (and the switching thereof), and an emergency switching is immediately caused, as illustrated in step S20. Hence, in step S18-1 it is checked after the change into the maintenance mode whether an arbitrary access 34 is open. As long as none of the accesses 34 is open, there is no danger because the operator 40 in this case is outside of the aisles 16. However, if one of the accesses 34 is opened (and/or unlocked), it is additionally checked in step S18-2 whether the right access 34 has been opened. The right access 34 is the access 34 of the to-be-maintained aisle 16. The to-be-maintained aisle 16 is determined by a corresponding input by the operator 40, which in turn is transmitted to the control device 46, in case that less switch devices 48 than aisles 16 are present.

If it was determined in step S18-2 that the right access 34 has been unlocked and opened, the sensors 30 of the load handling devices 28 of the rack serving units 18, which are serving directly adjacent aisles 16 (cf. step S22), are activated.

In step S24 it is inquired whether the load handling devices 28 monitored in the step S22 are extracted, or have been extracted into the rack 14 which is arranged directly adjacent to the to-be-maintained aisle 16. In the example of FIG. 1 the racks 14-2 and 14-3 or 14-4 and 14-5 represent same. If one of these sensors 30 detects an extracted one of the load handling devices 28, the emergency switching described in the step S20 is caused, preferably immediately. During the emergency switching at least the aisle 16 in which the triggering load handling device 28 is operated is shut down.

As long as the activated sensors 30 do not detect anyone of the only one-sided operated load handling devices 28 in the "forbidden area", the directly adjacent aisles 16 can be operated further in the one-side operational mode (cf. step S26).

In step S28 it can be inquired whether, or when, the maintenance work is finished. For example, this happens by monitoring the closing and locking of the corresponding door 36. As long as the maintenance work is not finished the monitoring of the motion of the load handling devices 28 into the forbidden areas is continued (cf. step S24). However, if the maintenance work is completed the corresponding access key 54 can be inserted into the switch device 48 for shifting same into the automatic position (cf. step S30). Subsequently, the warehouse system 10 is again in the automatic mode as described in the step S10.

In the above-given description of the figures the choice of the orientation of the coordinate system was generally referred to the designations as typically used in logistics so that the longitudinal direction is designated by X, the transversal direction is designated by Z and the (vertical) height is designated by Y.

Further, identical parts and features have been provided with the same reference numerals. Disclosures contained in the description can be transferred analogously to same parts and features having the identical reference numerals. Position and orientation indications (such as "up", "down", "lateral", "longitudinal", "horizontal", "vertical" and the like) are referring to the immediately described figure. If the position or orientation is changed, these indications are to be transferred analogously to the new position and orientation.

A double-side extractable and retractable load handling device is to be understood as a load handling device such as a fork or a shuttle which can be extracted both to the left and right racks of a rack aisle. A one-sided operated storage and retrieval device can extract and retract the load handling device thereof only in one single side of the rack.

Therefore, what I claim is:

1. A warehouse system comprising:
    a control device;
    a plurality of racks defining a plurality of rack aisles therebetween, wherein each of the rack aisles comprises an access and is secured by means of the access against entry of an unauthorized operator, the access being locked and unlocked by means of an access key, wherein a first sensor monitors whether the access is closed or open and transmits corresponding status signals to the control device;
    a plurality of rack serving units, wherein in each of the rack aisles at least respectively one rack serving unit travels in an automated manner at least along a longitudinal direction of the rack aisle and wherein each of the rack serving units comprises at least one load handling device, which can be extracted and retracted on both sides in a transverse direction for storing and retrieving storage goods in an automated manner in and from each of the racks in an automatic mode, the racks being arranged directly adjacent to the respective load handling device, wherein each of the load handling devices has assigned at least one second sensor which detects whether the load handling device is in a retracted neutral position, currently extracts or is extracted, and which transmits a corresponding state signal to the control device; and
    at least one aisle-serving switch device, wherein each of the switch devices communicates with the control device and is settable physically by means of the access key between an automatic position and a maintenance position, wherein the access key in the automatic position is physically connected inseparably to the respective switch device and in the maintenance position is physically connected separably from the respective switch device, in order to open one of the accesses which is determined by one of the to-be-maintained rack aisles;
    wherein the control device is adapted:
       to communicate with the rack serving units, each of the switch devices, the first sensors, and the second sensors;
       to operate each of the rack serving units in the automatic mode if the status signal signals that all of the accesses are closed;
       to instruct each of the load handling devices of one of the rack serving units which is operated in a maintenance mode in a directly neighbouring rack aisle adjacent to the to-be-maintained rack aisle to which the operator needs to gain admission for the purpose of maintenance, to only store and retrieve storage goods in and from such racks which are not arranged directly adjacent to the to-be-maintained rack aisle; and
       to initiate an emergency switching off of the to-be-maintained rack aisle and at least of the directly adjacent rack aisle, if a state signal comes in which indicates that one of the load handling devices of the rack servicing units of the directly adjacent rack aisles is extracted towards one of the racks which is arranged directly adjacent to the to-be-maintained rack aisle.

2. The warehouse system of claim 1, wherein each of the access keys mechanically interacts with both one of the switch devices and only one of the accesses for changing the switch device and for unlocking the only one of the accesses.

3. The warehouse system of claim 1, wherein one of the access keys electronically locks and unlocks the access of the to-be-maintained rack aisle, wherein the control device is adapted to only unlock the access of the to-be-maintained rack aisle if the state signals of the directly adjacent rack aisles signal that none of the corresponding load handling devices is still extracted towards the to-be-maintained rack aisle.

4. The warehouse system of claim 1, wherein each of the rack aisles respectively comprises one of the aisle-serving switch devices, wherein each one of the switch devices comprises an individual access key.

5. The warehouse system of claim 1, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

6. The warehouse system of claim 1, wherein the at least one load handling device is a shuttle.

7. The warehouse system of claim 2, wherein one of the access keys electronically locks and unlocks the access of the to-be-maintained rack aisle, wherein the control device is adapted to only unlock the access of the to-be-maintained rack aisle if the state signals of the directly adjacent rack aisles signal that none of the corresponding load handling devices is still extracted towards the to-be-maintained rack aisle.

8. The warehouse system of claim 7, wherein each of the rack aisles respectively comprises one of the aisle-serving switch devices, wherein each one of the switch devices comprises an individual access key.

9. The warehouse system of claim 8, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

10. The warehouse system of claim 2, wherein each of the rack aisles respectively comprises one of the aisle-serving switch devices, wherein each one of the switch devices comprises an individual access key.

11. The warehouse system of claim 10, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

12. The warehouse system of claim 2, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

13. The warehouse system of claim 3, wherein each of the rack aisles respectively comprises one of the aisle-serving switch devices, wherein each one of the switch devices comprises an individual access key.

14. The warehouse system of claim 13, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

15. The warehouse system of claim 3, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

16. The warehouse system of claim 4, wherein each of the switch devices comprises a light-emitting push-button, wherein each of the light-emitting push-buttons comprises a lamp which: is not emitting light if the associated rack aisle is in a double-side automatic mode; flashes if the associated rack aisle is still in the double-side automatic mode; and permanently emits light as soon as the associated rack aisle is in a one-side automatic mode, or in the maintenance mode.

17. A method for safely operating an automatic warehouse system that comprises a control device, at least one switch device, at least one access key, a plurality of rack aisles each having an access provided with a first sensor, wherein in each of the rack aisles at least one rack serving unit having a load handling device, which is provided with a second sensor respectively, is provided and automatically operated in an automatic mode, and wherein each of the rack aisles respectively comprises an access which can be locked, opened and closed, the method comprising the following steps:
  inquiring whether the control device of the warehouse system changes to a maintenance mode;
  removing the access key from the switch device by shifting the access key from an automatic position to a maintenance position and subsequently taking out same, and moving the removed access key to a to-be-maintained rack aisle, after having changed to the maintenance mode;
  unlocking the access of the to-be-maintained rack aisle by means of the removed access key;
  inquiring from the corresponding first sensor whether the corresponding accesses is open, and activating the corresponding second sensor which monitors the load handling devices of the rack serving units being arranged directly adjacent to the to-be-maintained rack aisle, with regard to a neutral position of the corresponding load handling device as soon as it has been determined that the access of the to-be-maintained rack aisle is open; and
  performing an emergency switching off of the to-be-maintained rack aisle:
    if one of the accesses is opened during the automatic mode;
    if an access different than the access of the to-be-maintained rack aisle is opened during the maintenance mode; or
    if the access of the to to-be-maintained rack aisle is opened and the load handling device of one of the rack serving units, being arranged directly adjacent to the to-be-maintained rack aisle leaves the neutral position towards the to-be-maintained rack aisle or has already left same.

18. The method of claim 17, wherein an article range is distributed to each of the rack aisles so that each article of the article range is stocked in both racks which are defining the respective rack aisle therebetween.

* * * * *